United States Patent
Nardoza et al.

(10) Patent No.: US 6,503,582 B1
(45) Date of Patent: Jan. 7, 2003

(54) FLUID-SWELLABLE COMPOSITION, DEVICE AND METHOD FOR USING THE SAME

(75) Inventors: Joseph Nardoza, Maywood, NJ (US); Lawrence Mass, Rye Brook, NY (US); Susan A. Reyes, Agoura Hills; Abimael Maelo Cordova, Downey, both of CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 08/914,438

(22) Filed: Aug. 19, 1997

(51) Int. Cl.[7] .................................................. A01N 1/00
(52) U.S. Cl. .............................. 428/15; 428/9; 428/12; 428/29; 428/63; 428/166; 428/327; 446/153
(58) Field of Search ................................. 428/15, 9, 12, 428/13, 29, 63, 166, 119, 327, 913, 542.8; 446/153, 267, 385

(56) References Cited

U.S. PATENT DOCUMENTS

| | | |
|---|---|---|
| 2,662,882 A | 12/1953 | Christianson et al. .......... 536/2 |
| 2,856,371 A | 10/1958 | Gates et al. .................... 524/23 |
| 3,591,389 A | 7/1971 | Schnelder .................... 426/271 |
| 3,627,855 A | 12/1971 | Schott et al. ................. 525/243 |
| 4,076,663 A | 2/1978 | Masuda et al. ........... 525/54.31 |
| 4,124,748 A | 11/1978 | Fujimoto et al. ............. 525/60 |
| 4,273,734 A | 6/1981 | Seiderman ............... 264/451 X |
| 4,500,670 A | 2/1985 | McKinley et al. .......... 524/445 |
| 4,548,734 A | 10/1985 | Chaux et al. ................. 252/311 |
| 4,622,920 A | 11/1986 | Goss ............................ 119/173 |
| 4,725,629 A | 2/1988 | Garvey et al. .............. 521/137 |
| 4,731,391 A | 3/1988 | Garvey ........................ 521/137 |
| 4,737,533 A | 4/1988 | Charmot et al. .............. 524/22 |
| 4,881,915 A * | 11/1989 | Liaw ........................... 446/153 |
| 4,886,509 A | 12/1989 | Mattsson .................... 604/349 |
| 4,992,100 A | 2/1991 | Koepff et al. ............. 106/160.1 |
| 5,100,397 A | 3/1992 | Poccia et al. ................ 604/365 |
| 5,145,906 A | 9/1992 | Chambers et al. ........... 524/732 |
| 5,171,237 A | 12/1992 | Poccia et al. ........... 604/365 X |
| 5,346,935 A | 9/1994 | Suzuki et al. ................. 524/18 |
| 5,356,626 A | 10/1994 | Yeo et al. ................ 424/195.1 |
| 5,356,678 A | 10/1994 | Heitzhause et al. ........ 428/35.6 |
| 5,424,265 A | 6/1995 | Weinstein ................... 502/400 |
| 5,429,860 A | 7/1995 | Held et al. ................... 428/195 |
| 5,433,994 A | 7/1995 | McKinney et al. .. 428/304.4 X |
| 5,451,219 A | 9/1995 | Suzuki et al. ............ 604/385.2 |
| 5,453,323 A | 9/1995 | Chambers et al. .......... 428/402 |
| 5,462,972 A | 10/1995 | Smith et al. .................. 521/53 |
| 5,539,019 A | 7/1996 | Suskind et al. ......... 428/407 X |
| 5,549,590 A | 8/1996 | Suskind et al. ......... 428/407 X |
| 5,595,731 A | 1/1997 | Vallieres .................... 424/76.4 |
| 5,597,873 A | 1/1997 | Chambers et al. ....... 525/330.1 |
| 5,624,971 A | 4/1997 | Wilson ........................ 521/137 |

* cited by examiner

*Primary Examiner*—Deborah Jones
*Assistant Examiner*—Abraham Bahta
(74) *Attorney, Agent, or Firm*—Kolisch, Hartwell, Dickinson, McCormack & Heuser

(57) ABSTRACT

A reusable, fluid-swellable absorbent composition is disclosed. The composition generally includes a superabsorbent polymer, a gum, a film-forming resin and gelatin. The composition may further include a colorant and/or reflective particles, and it is particularly well-suited for use with amusement devices, such as for use by children. The device includes at least one sample of the invented composition, preferably including colorant and/or glitter, a volume of water and a structure including a base and a closed perimeter extending outwardly from the base. The structure includes a plurality of discrete regions, and may collectively resemble an object, scene or other image. Then upon placement of a small quantity of the composition into a particular region and addition of water to the quantity, the composition swells, expands and generally conforms to the shape of the region.

23 Claims, 2 Drawing Sheets

FLUID-SWELLABLE COMPOSITION, DEVICE AND METHOD FOR USING THE SAME

BACKGROUND AND SUMMARY OF THE INVENTION

The invention relates generally to fluid-swellable compositions, and more particularly to a fluid-swellable composition that includes a superabsorbent polymer, as well as to an amusement device that includes the composition and a method for using the same.

Superabsorbent polymers are water-swellable compounds that absorb at least twenty times their own weight in fluid. A superabsorbent polymer should retain its original identity, have sufficient physical integrity to resist flow and fusion with neighboring particles, and swell when it absorbs a fluid, such as water or a water-based liquid. Furthermore, superabsorbent polymers should not dissolve in the fluid. Because of the exceptional absorbent qualities of these compounds, they are commonly used in disposable diapers, industrial spill kits and other spill- or leak-preventing articles. Many conventional superabsorbent polymers require the addition of a cross-linking agent to increase the absorbency of the material.

Examples of superabsorbent polymers are presented in U.S. Pat. Nos. 4,076,663; 4,124,748; 4,500,670; 4,725,629; 4,731,391; 5,100,397; 5,145,906; 5,171,237; 5,433,994; 5,453,323; 5,462,972; 5,595,731; 5,597,873; and 5,624,971, the disclosures of which are hereby incorporated by reference.

The present invention is a new fluid-swellable composition containing a superabsorbent polymer. The composition includes a superabsorbent polymer and gelatin, preferably further include a gum and a binder, and is especially well-suited for use by children as an amusement device. The composition absorbs a significant volume of a water-based fluid, without exhibiting many of the problems that have plagued existing superabsorbent polymer compositions, such as requiring the addition of a cross-linking agent, gel-blocking, or reacting adversely to hydrophobic elements of the mixture in which it is used or the added fluid. Gel-blocking occurs when water causes the composition to clump, leaving the interior of the clump unexposed to water. Furthermore, the composition is reusable and contains preservatives selected to preserve the composition in both dry and wet states.

It is an object of the present invention to provide a fluid-swellable composition which swells and absorbs a significant volume of water-based fluid per unit of the composition.

It is a further object of the present invention to provide a reusable fluid-swellable composition.

Yet another object of the present invention is to provide an amusement device which includes the invented fluid-swellable composition and a play structure or structure for use with the composition.

Still another object is to provide an amusement device that appears life-like, glitters and significantly expands with the addition of a water-based fluid.

Another object is to provide an amusement device that includes a colorant and reflective particles that give the device a magical, life-like, crystalline appearance upon the addition of water or a water-based fluid.

These and other objects and advantages are obtained by the invention, which is described below in conjunction with the accompanying drawings. Many other features, advantages and additional objects of the present invention will be apparent to those versed in the art upon making reference to the detailed description which follows and the accompanying drawings in which preferred embodiments incorporating the principles of this invention are disclosed as illustrative examples only.

DETAILED DESCRIPTION OF THE PREFERRED EMBODIMENTS

Figure 1:
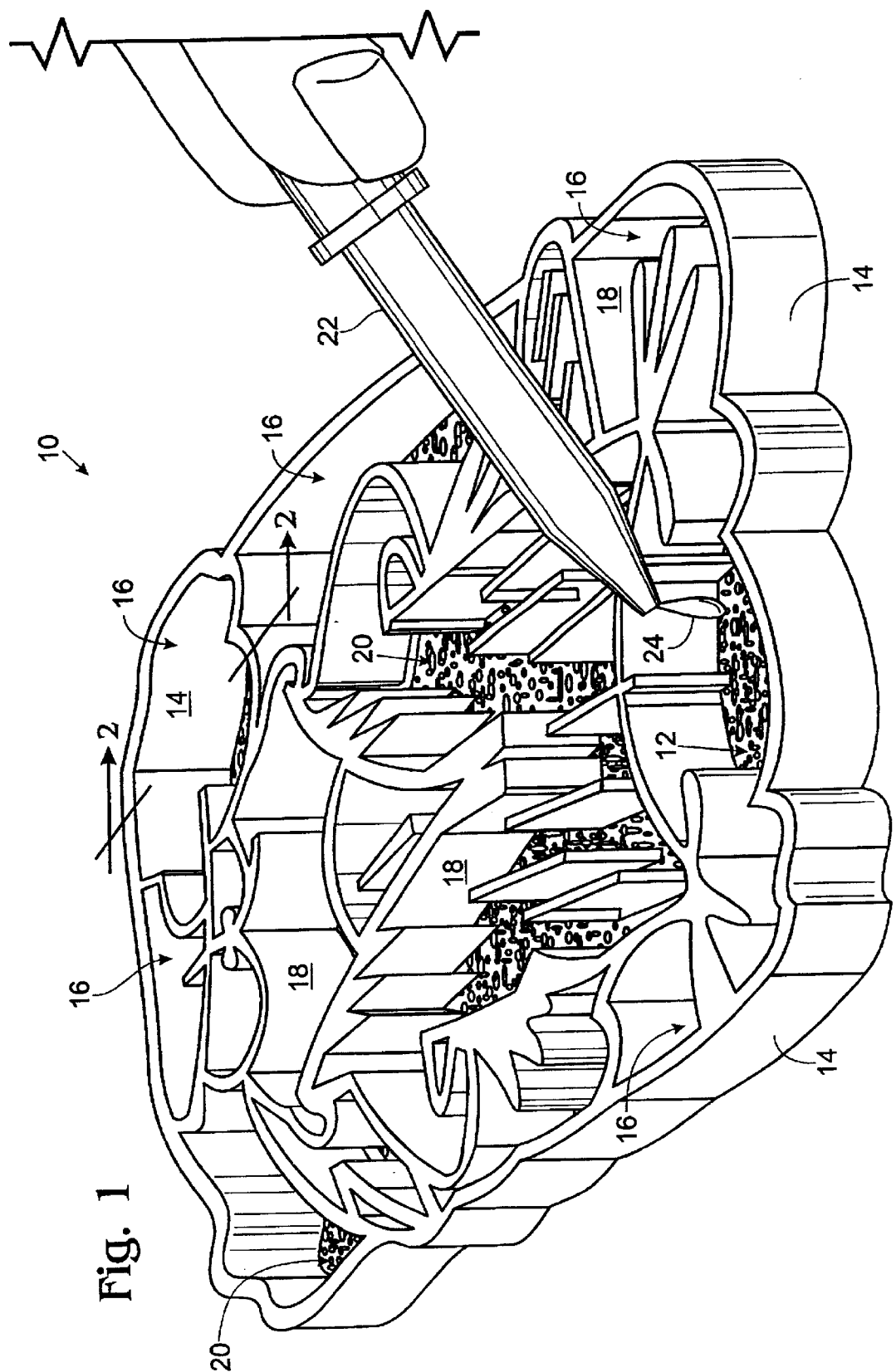
FIG. 1 is an isometric view of a structure constructed according to a preferred embodiment of the invented amusement device and containing a fluid-swellable composition created according to a preferred embodiment of the invented composition.

The present invention is an improved water-swellable composition containing a superabsorbent polymer, an amusement device incorporating the composition and a method for using the same. The composition includes a superabsorbent polymer, a gum, gelatin and a binder.

The superabsorbent polymer should be selected so that it has a particle size with a maximum diameter in the range of approximately 50 microns to approximately 400 microns. Preferably the maximum particle diameter is in the range of approximately 100 microns to approximately 300 microns, and even more preferably in the range of approximately 150 microns to 250 microns. Particles with maximum diameters of approximately 200 microns are used in the most preferred embodiment of the invention.

An additional property of a suitable superabsorbent polymer is a pH in the range of approximately 6 to approximately 9, preferably in the range of approximately 6.5 to approximately 8.5, and even more preferably in the range of approximately 7 to approximately 8.

A further property of a suitable superabsorbent polymer is that it contains little water-extractable material. Preferably, the polymer contains substantially no water-extractable material, and even more preferably, no water-extractable material.

It is believed that any superabsorbent polymer, such as those described in the above-listed patents and the patents cited therein, would be suitable so long as it exhibits the above-recited properties and does not react adversely to the other components of the composition described herein. It has been determined that superabsorbent polymers formed from starch with grafted side chains of 2-propenamide-co-2-propenoic acid with mixed sodium and aluminum salt copolymers are particularly well-suited for use in the present invention. Examples of such superabsorbent polymers are manufactured by Grain Processing Corp. of Muscatine, Iowa, sold under the trademark WATERLOCK®, and are capable of absorbing up to 500 milliliters of water per gram of polymer. Both the D-213 and D-223 formulas of WATER-LOCK® are exceptionally well-suited for use in the present invention.

The gum may be selected from a variety of natural, or modified synthetic gums, such as are described in U.S. Pat. Nos. 4,548,734, the disclosure of which is hereby incorporated by reference. The gum should not, however, react adversely to the other components of the composition and should add cohesiveness to the composition, giving it a non-mushy, fixatropic and gel-like appearance. Preferably, the gum also has some degree of absorption of glycols or other hydrophobic elements of the composition, which may be present in other components of the composition or in the fluid added to the composition. This glycol-absorbing property enables the composition to absorb fully water without causing hydrophobic components or the composition to separate, and thereby be isolated, from the rest of the composition. Therefore, the entire composition and the absorbed water are united into a product without the formation of byproducts or non-included components. An example of a suitable gum exhibiting these properties is guar gum, an off-white powder that forms a gel when added to water, and which is manufactured by Rhone-Poulenc of Cranbury, N.J. and sold under the trade name JAGUAR 8012.

Another component of the invented fluid-swellable composition is gelatin, such as such a 250 Bloom Edible Porkskin Gelatin manufactured by Kind & Knox Gelatine, Inc. of Sioux City, Iowa. Gelatin swells in cold water and will dissolve in water if warmed to a temperature greater than approximately 35° C. The gelatin adds to the look and feel of the composition when fluid is added, as well as adding a degree of thickness and unity to the composition once fluid is added. Additional features of including gelatin in the composition follow, in the discussion of the method of using the invention.

The binder is preferably a film-forming resin that causes the superabsorbent polymer and the gelatin to adhere or stick together. This increases the surface tension and fixatropic characteristic of the composition once fluid is added, cooperating with the gelatin to give the composition a relatively grainy or apple sauce-like texture upon the addition of water. A suitable film-forming resin is manufactured by BASF Corp. of Mount Olive, N.J. and sold under the trademark LUVISKOL® VA 64 powder. LUVISCOL® is a copolymer of vinylpyrrolidine and vinyl acetate. The amount of this component preferably will vary proportionately to the amounts of gelatin and superabsorbent polymer used in the composition, in that as more gelatin and polymer are added, it is preferable to also increase the percentage of this film-forming resin.

The composition should also contain a preservative. Because the composition may be stored for long periods of time in a dry state, used to absorb and reabsorb fluid for a period of time, and then stored for a long period of time after the fluid has evaporated, it is important that the preservative effectively preserves the composition in both its dry and liquid or wet states. Examples of suitable preservatives for preserving the composition in its wet, or hydrated, state are sodium chloride, available from Fischer Scientific of Fairlawn, N.J., and DOWACIL® 200, available from the Dow Chemical Company of Midland, Mich. Examples of suitable preservatives for preserving the composition in its dry state are parabens, such as methyl paraben (available from Mallinckrodt of Chesterfield, Mo.), ethyl paraben (available from UENO Fine Chemicals Industry, Ltd. of Osaka, Japan) and butyl paraben (available from Napp Chemicals of Lodi, N.J.). It should be understood that the type and quantity of preservative used in the present invention will vary depending on the toxicology and quantity of other components contained therein.

To make the invented composition, the above-recited components, which are each a granular or powder-like material, are mixed together and blended, such as in a ribbon or rotary blender for approximately forty-five minutes to one hour. The resulting composition should be fairly uniformly mixed and should pass through a 40-mesh screen.

The ranges of the above-recited components in the composition are listed in the following table:

| Component | Percentage (wt %) |
|---|---|
| superabsorbent polymer | 5 to 65 |
| gum | 0 to 20 |
| gelatin | 10 to 60 |
| film-forming resin | 0 to 40 |

More preferably, the ranges of the components are within the following ranges:

| Component | Percentage (wt %) |
|---|---|
| superabsorbent polymer | 20 to 60 |
| gum | 0.5 to 15 |
| gelatin | 15 to 55 |
| film-forming resin | 0.5 to 30 |

Even more preferably, the ranges of the components are within the following ranges:

| Component | Percentage (wt %) |
|---|---|
| superabsorbent polymer | 30 to 55 |
| gum | 1 to 10 |
| gelatin | 20 to 50 |
| film-forming resin | 5 to 25 |

Still more preferably, the ranges of components are within the following ranges:

| Component | Percentage (wt %) |
|---|---|
| superabsorbent polymer | 35 to 55 |
| gum | 1.5 to 10 |
| gelatin | 25 to 45 |
| film-forming resin | 10 to 20 |

When preservatives are added to the composition, they will amount to approximately 10% of the composition, however sodium chloride generally comprises a majority of this percentage.

The previously described components form a new fluid-swellable absorbent composition, which is particularly well-suited for use in absorbing water or a water-based fluid. The composition is a dry, granular material, which has a generally white color. Furthermore, the composition is able to absorb a significant quantity of water or other fluid without requiring the addition of a separate cross-linking agent. The composition further has a fairly neutral pH (pH of approximately 7–7.5 for a one-percent solution) and does not appear to encounter the gel-blocking problems which have plagued many prior art superabsorbent compositions.

A further feature of the invented composition is that it is reusable, in that it will reabsorb a new volume of fluid or water once an initial volume has evaporated. Upon the addition of a second volume of fluid to a used, dehydrated sample of the composition, the composition will absorb this new volume of fluid and swell to its original expanded state. Furthermore, the blend of preservatives preserves the composition at all times, regardless of its current state.

An application of the previously described composition is for use in amusement devices, particularly children's amusement devices. Specifically, the addition of reflective particles (glitter) and/or colorant to a composition containing a superabsorbent polymer and gelatin, and preferably including the above-recited components and compositions, results in a composition that provides hours of amusement and entertainment, especially to children, upon the addition and readdition of water or another suitable water-based fluid.

Reflective particles or other material, such as glitter, are added to the composition prior to the addition of fluid. Preferably, the glitter is added to the composition prior to the mixing step to ensure a fairly uniform distribution of glitter within the final composition. A single color and shape of glitter may be used, or alternatively, a variety of colors and/or shapes and sizes may be used. Glitter is commonly available from a variety of sources, including glitter sold under the trade name PRISMA GLITTERS and manufactured by The Gick Companies of Irvine, Calif. When water or another suitable fluid is added to the composition, the composition expands and grows dramatically, as discussed above. As the composition grows, the glitter is suspended and transported with the other components of the composition as it swells and expands. This gives the composition a life-like, magical appearance, which children and others find to be fun and captivating. The product composition glitters and sparkles, having a look of crystals or gems, while in reality being a malleable, moldable composition that readily conforms to the shape of the surface on which it is placed.

Another fun addition to the composition is colorant. Because the previously described composition is essentially colorless once water is added to it, it readily receives and is tinted to any desired color. One method of adding colorant to the composition is to mix the colorant, such as a dry or liquid dye, with the fluid prior to adding it to the composition. When the composition absorbs the colored fluid, the colorant is dispersed within the resulting, expanded product, thereby enabling a user to selectively color the product. When the product dehydrates, the color remains even though the fluid has evaporated. It should be understood that a variety of colors may be used either alone or in combination to create multicolored products. Examples of suitable colors are the following powders: FD&C Blue #1, FD&C Yellow #5, FD&C Red #4 and D&C Red #33, each of which may be obtained from Warner & Jenkinson, Inc. of St. Louis, Mo.

Another method of adding colorant to the composition is to add a powdered or granular dye to the mixture prior to or after the mixing step. Because the dye is initially mixed within the other, primarily white components, the composition has a generally white color prior to the addition of fluid, although it may have a slight hue that reflects the color of the dye. The degree of this hue will vary depending on the particle size of the dye. As the fluid is added to the composition, the color of the dye will become much more readily apparent as the dye colors the fluid and the rest of the composition. It should be understood that glitter and either or both forms of colorant may be used alone or in combination with any of the above-recited compositions.

When solid colorant is added to the composition, it is preferable that the dye is initially ground to reduce its particle size. When the colorant is ground so that it will pass through a 160-mesh screen, the composition will have a generally white composition, with the specific color of the colorant being unknown to a user until fluid is added to the composition. The finely ground dye can be mixed with the composition either prior to or after the blending process, although the resulting mixture should be mixed or blended to ensure that the dye is distributed throughout the composition. The finely ground dye gives the composition an even greater magical appearance because a child will be surprised when different samples of white "magic crystal powder" come to life and grow into vibrantly colored, significantly expanded products.

The preferred form of this embodiment includes both a colorant and reflective particles, thereby giving the maximum shine, color-change and, in effect, magical appearance to the product formed when fluid is added to the composition. To prepare this preferred form of the composition, the above-recited superabsorbent polymer, gelatin, gum, glitter and preservatives are mixed and blended for thirty minutes in a ribbon or rotary blended. Preferably, the DOWICILL® is initially passed through a 100-mesh screen to eliminate larger particles that will not pass through the screen. Next, the film-forming resin, LUVISKOL®, is mixed with granular colorant, which has been blending and passed through a 160-mesh screen. The mixture is then shaken, such as with a vibratory shaker, for fifteen minutes and then combined with the superabsorbent polymer mixture. The resulting mixture is then blended for an additional thirty minutes, after which it should pass through a 40-mesh screen. Larger particles can be reblended until the desired particle size is obtained. It should be understood that the above-recited method is applicable to create compositions that do not include all of the components, such as a composition that selectively does not include glitter, colorant, film-forming resin or gum, simply by leaving out the particular component and otherwise following the method prescribed above.

When preservatives, glitter and colorant are added to the composition, the components will each be present in the following ranges:

| Component | Percentage (wt %) |
| --- | --- |
| superabsorbent polymer | 5 to 50 |
| gum | 0 to 4 |
| gelatin | 5 to 40 |
| film-forming resin | 0 to 40 |
| preservative | 0 to 20 |
| glitter | 0 to 35 |
| colorant | 0 to 10 |

Even more preferably, the ranges of the components are within the following ranges:

| Component | Percentage (wt %) |
| --- | --- |
| superabsorbent polymer | 15 to 45 |
| gum | 0.5 to 5 |
| gelatin | 15 to 35 |
| film-forming resin | 2 to 20 |
| preservative | 0.5 to 15 |
| glitter | 5 to 30 |
| colorant | 0.01 to 5 |

Still more preferably, the ranges of components are within the following ranges:

| Component | Percentage (wt %) |
|---|---|
| superabsorbent polymer | 25 to 40 |
| gum | 0.5 to 3 |
| gelatin | 20 to 30 |
| film-forming resin | 5 to 15 |
| preservative | 1 to 10 |
| glitter | 10 to 25 |
| colorant | 0.03 to 1.5 |

Illustrated below in the following table are particular compositions which have been shown to produce compositions with acceptable product quality, color, appearance and life:

| Component | blue | yellow | orange | green | pink | red |
|---|---|---|---|---|---|---|
| Water Lock ® | 36.9670 | 36.9670 | 36.9670 | 36.9670 | 36.9670 | 36.9670 |
| Luviskol ® | 10.0693 | 10.0693 | 10.0693 | 10.0693 | 10.0693 | 10.0693 |
| Gelatin | 23.7330 | 23.5149 | 23.5586 | 23.6079 | 23.7999 | 23.7349 |
| Jaguar | 1.1679 | 1.1679 | 1.1679 | 1.1679 | 1.1679 | 1.1679 |
| Butyl Paraben | 0.1396 | 0.1396 | 0.1396 | 0.1396 | 0.1396 | 0.1396 |
| Dowicil ® 200 | 0.3000 | 0.3000 | 0.3000 | 0.3000 | 0.3000 | 0.3000 |
| Methyl Paraben | 0.2500 | 0.2500 | 0.2500 | 0.2500 | 0.2500 | 0.2500 |
| Ethyl Paraben | 0.4653 | 0.4653 | 0.4653 | 0.4653 | 0.4653 | 0.4653 |
| Sodium Chloride | 8.3760 | 8.3760 | 8.3760 | 8.3760 | 8.3760 | 8.3760 |
| Prisma Glitters | 18.4500 | 18.4500 | 18.4500 | 18.4500 | 18.4500 | 18.4500 |
| FD&C Blue #1 Pwr. | 0.0819 | | | 0.0070 | | 0.0300 |
| FD&C Yellow #5 Pwr. | | 0.3000 | 0.2204 | 0.2000 | | |
| D&C Red #33 Pwr. | | | | | 0.0150 | 0.0500 |
| FD&C Red #4 Pwr. | | | 0.0359 | | | |
| TOTAL | 100.000 | 100.000 | 100.000 | 100.000 | 100.000 | 100.000 |

It should be understood, however, that the percentage of preservative, and especially the percentage of colorant and glitter, may vary depending upon the particular preservative used and the amount of glitter and brightness of color desired. For example, embodiments of the composition which contain a higher percentage of glitter are presented below in the following table:

| Component | blue | yellow | orange | green | pink | red |
|---|---|---|---|---|---|---|
| Water Lock ® | 26.8822 | 26.8822 | 26.8822 | 26.8822 | 26.8822 | 26.8822 |
| Luviskol ® | 13.4016 | 13.4016 | 13.4016 | 13.4016 | 13.4016 | 13.4016 |
| Gelatin | 27.5305 | 27.3124 | 27.3561 | 27.4054 | 27.5974 | 27.5324 |
| Jaguar | 1.1679 | 1.1679 | 1.1679 | 1.1679 | 1.1679 | 1.1679 |
| Butyl Paraben | 0.1396 | 0.1396 | 0.1396 | 0.1396 | 0.1396 | 0.1396 |
| Dowicil ® 200 | 0.3000 | 0.3000 | 0.3000 | 0.3000 | 0.3000 | 0.3000 |
| Methyl Paraben | 0.2500 | 0.2500 | 0.2500 | 0.2500 | 0.2500 | 0.2500 |
| Ethyl Paraben | 0.4653 | 0.4653 | 0.4653 | 0.4653 | 0.4653 | 0.4653 |
| Sodium Chloride | 8.3760 | 8.3760 | 8.3760 | 8.3760 | 8.3760 | 8.3760 |
| Prisma Glitters | 21.4050 | 21.4050 | 21.4050 | 21.4050 | 21.4050 | 21.4050 |
| FD&C Blue #1 Pwr. | 0.0819 | | | 0.0070 | | 0.0300 |
| FD&C Yellow #5 Pwr. | | 0.3000 | 0.2204 | 0.2000 | | |
| D&C Red #33 Pwr. | | | | | 0.0150 | 0.0500 |
| FD&C Red #4 Pwr. | | | 0.0359 | | | |
| TOTAL | 100.000 | 100.000 | 100.000 | 100.000 | 100.000 | 100.000 |

The invented composition may also be used in an alternate embodiment of the previously described amusement device. This embodiment uses any of the previously described compositions and includes a play structure, such as the structure shown in FIG. 1 and indicated generally at 10. The play structure is formed from a durable, waterproof material, such as molded plastic, and includes a base with a closed perimeter region that extends generally away from the base, thereby defining an enclosure having a lower surface with an enclosed lateral boundary.

An example of a suitable play structure is shown in FIG. 1 and generally indicated at 10. Structure 10 includes a base 10, perimeter region 12 and contains a plurality of regions 16, each having walls 18 extending generally away from the base. Each region 16 has a closed perimeter defined by walls 18 alone or in conjunction with the base's perimeter region 14. Structure 10 and regions 16 may have a variety of shapes, including geometric or other designs, or more specialized shapes, such as to resemble animals, fictional and nonfictional characters, storybook scenes, and landscapes.

To use the amusement device, the user, often a child, requires at least one sample of any of the previously described fluid-swellable compositions or material, structure 10 and a volume of fluid, usually water. Preferably, the user has a plurality of samples of the fluid-swellable composition, each containing a different color of colorant premixed in the composition and each further containing a glitter. Next, a small quantity of the material is placed on the structure's base 12 within closed perimeter region 14. When structure 10 includes a plurality of distinct regions 16, the user must select which region is going to be used, as well as the color of the fluid-swellable material to be used in the selected region.

Figure 2:
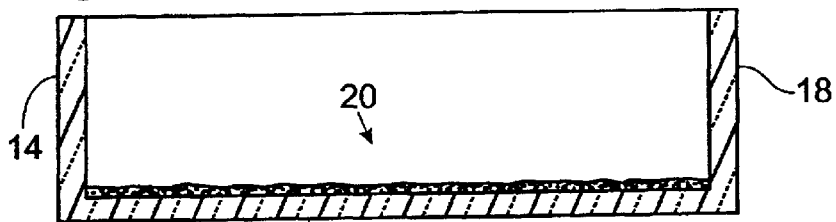
FIG. 2 is an enlarged, sectional view taken along the line 2—2 in FIG. 1 and showing a portion of one of the regions on the structure of FIG. 1 with a thin layer of the composition distributed within the region.

As shown in FIG. 1, structure 10 has numerous distinct regions 16 and is shaped to resemble a bird. The previously described fluid-swellable composition or material is indicated at 20 and is spread across a substantial portion of the structure's base 12. FIG. 2 shows a thin layer of material 20 spread over a substantial portion of the structure's upper right-hand region 16. A thickness of material 20 that is approximately one or two particles deep covering a substantial portion of the base is sufficient to produce a product that completely fills the region when water is added, extending between one quarter and three quarters of an inch away from the base. Therefore, the thickness shown in FIG. 2 greatly exceeds the necessary amount to absorb enough water to fill the region. When additional material is used, the resulting product is significantly more dense and will also tend to have a darker color, as a result of more colorant being present.

Figure 3:
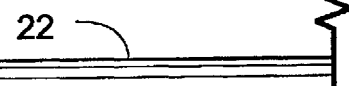
FIG. 3 shows the region and composition of FIG. 2, with the composition in a partially hydrated state.
Figure 3:
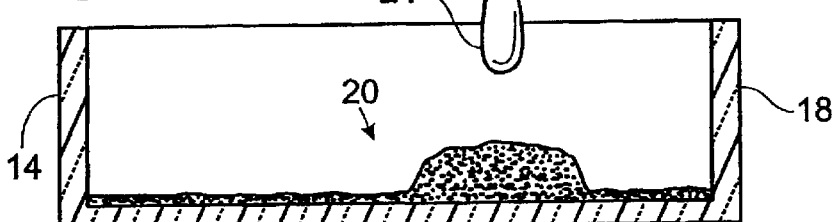
Figure 4:
FIG. 4 shows the region and composition of FIG. 2 upon the addition of additional fluid.
Figure 4:
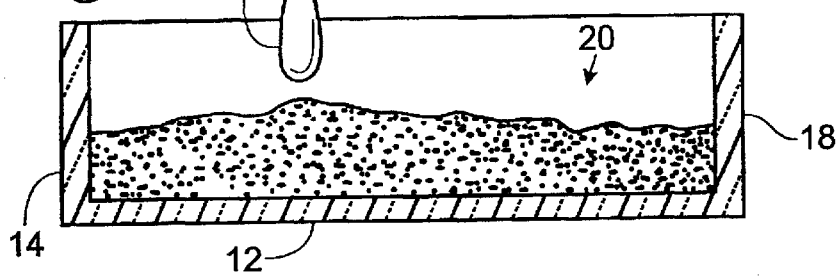
Figure 5:
FIG. 5 shows the region and composition of FIG. 2 with sufficient fluid added and absorbed to cause the composition to expand to the upper limits of the region.
Figure 5:
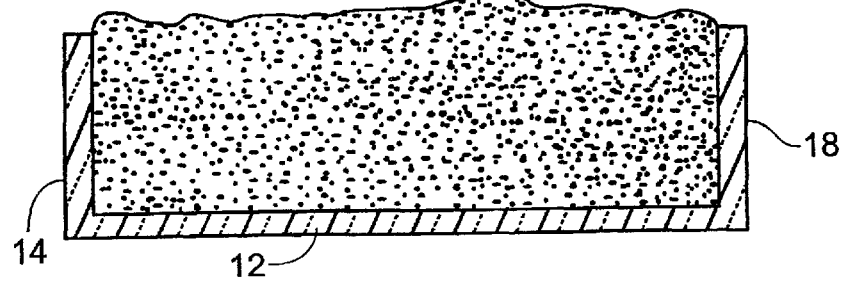

In the preferred method of using the invention, water is added drop-by-drop or incrementally to material 20 in structure 10. This can be done through any suitable means, such as with a straw, the user's finer, or with an eyedropper 22, which is shown depositing a drop of water 24 on the material in the lower portion of base 12 in FIG. 1. With the addition of each drop of water 24, material 20 absorbs the water and increases in size, swelling outwardly from base 12, as shown in FIG. 3. As the material expands, the colorant dyes material 20 and water 24, creating a vibrantly colored product. Furthermore, the glitter contained within the composition is suspended and transported by the product as it is formed, thereby causing the product to glimmer and sparkle as it expands. With each subsequent drop of water 24, the product increases in size within the region, as shown in FIGS. 4 and 5. As the product grows, it shines, glimmers, and appears life-like, in that it continues to expand and grow, undulating and sparkling as each drop of water is deposited, absorbed and spread within material 20.

When the user is satisfied with the look and appearance of the product in a particular region on the structure, the above-recited process can be repeated using another region and the same of a different color of material. When the structure and its regions generally resemble a scene, object, person, etc., which is identifiable to the user, then the user can select colors of the material that the user deems appropriate to be used in each region making up the scene, object, etc. Alternatively, the user can simply play with a variety of colors of the invented composition, used separately or in combination to make the user's own design or product. Similarly, colored water can be used to increase the overall appearance and color of the product.

It should be understood that the play structure may have a variety of shapes and should be constructed from a waterproof material. The structure may further be formed from a transparent material, thereby enabling the "magical, crystalline" product to be visible from all sides of the structure. Furthermore, while structure 10 has a generally planar configuration, the structure may include, independently or in combination with a planar region, a transparent region with a base and a perimeter region extending away from the base to a height of at least approximately one inch. It should be understood, however, that the height of the transparent perimeter region may exceed or greatly exceed one inch, extending upwardly from the base to form a volumetric tower which can be filled with layers of fluid-swellable material and fluid. Because the region is transparent, it enables the user and others to view the product or layers of product within its perimeter as well as the patterns and designs formed therefrom. It should be further understood that any of the previously described play structures may include a cover or a lid that may be selectively placed over at least a portion of the structure, thereby forming a top enclosure for the material contained within.

As discussed, the invented composition is reusable. Therefore, when the water begins to, or completely, evaporates from the product contained in a region on the structure, the user can simply add more water to return the product to its original shape, color and size. This is true regardless of whether the product is only partially dehydrated or whether it is completely dry and hardened. Alternatively, the user may choose to add more of the same or a different colored dry composition to the partially or completely dehydrated product prior to adding more water to it. By using a different color of composition or adding fluid dyed with a different colorant, the user is able to create products with new colors or mixes of colors as the user experiments with different mixtures and combinations.

The gelatin component of the invented composition adds another fun and exciting feature to the composition and to playing with the composition. If cold or room-temperature water or water-based fluid is used with the composition, then the gelatin does not set or gel the product into a defined shape. As the water evaporates from the product, the product is still freely malleable and shapeable by the user. When the product is completely dehydrated, it is a hard solid. Upon the addition of more water, however, it will return to a gel- or jelly-like state in which it will conform to the shape of the region within which it is used, and may be molded, separated and otherwise shaped by the user.

On the other hand, when hot water is used with the composition, the composition originally appears virtually identical to the above-described cold water product, even though the hot water causes the gelatin to dissolve. As the water evaporates, the partially dehydrated product generally retains its original shape and has a rubber-like, resilient texture and characteristic. When water is added to the completely dehydrated product, it returns to its original size and shape, even it if was removed from its original region prior to its rehydration.

While the present invention has been shown and described with reference to the foregoing preferred embodiments, it is to be understood by those of skill in the art that other changes in form and detail may be made therein without departing from the spirit and scope of the invention as defined in the following claims.

We claim:
1. An amusement device, comprising the combination of:
   a fluid-swellable composition including gelatin and a granar superabsorbent polymer; and
   a play structure having a base and a raised perimeter region extending away from the base, wherein the structure is configured to receive the material on the base within the perimeter region and further wherein adding a volume of water-based fluid causes the material to absorb the fluid and expand upwardly away from the base.

2. The device of claim 1, wherein the composition includes a colorant.

3. The device of claim 2, wherein the color of the colorant is not readily perceptable to a user until a fluid is added to the material.

4. The device of claim 1, wherein the composition includes glitter.

5. The device of claim 1, wherein the composition further includes a gum and a film-forming resin.

6. The device of claim 1, wherein the structure is shaped to include a plurality of regions having walls extending generally away from the base, each region having a perimeter defined at least in part by the walls and the perimeter region of the structure.

7. The device of claim 1, wherein the shape of the structure is selected from the group consisting of animals, fictional and nonfictional characters, storybook scenes, and landscapes.

8. The device of claim 1, wherein the structure includes a cover distal the base.

9. The device of claim 1, wherein the perimeter region of the structure is transparent.

10. A method of using an amusement device;
    providing a play structure having a base and a raised perimeter region extending away from the base, a fluid-swellable material including a superabosorbent polymer, and a volume of a water-based fluid;
    depositing a portion of the fluid-swellable material on the base of the structure within the perimeter region, and
    adding the volume of fluid to the material on the structure, thereby causing the fluid-swellable material to absorb the volume of fluid and expand within the structure and away from the base.

11. The method of claim 10, wherein the fluid-swellable material includes a colorant.

12. The method of claim 11, wherein the color of the colorant is not readily perceptable to a user until the fluid is added to the material.

13. The method of claim 10, wherein the fluid includes a colorant.

14. The method of claim 11, wherein the fluid-swellable composition includes reflective particles.

15. The method of claim 10, wherein the material includes a gum and a film-forming resin.

16. The method of claim 10, wherein the fluid is water.

17. The method of claim 10, wherein the structure is shaped to include a plurality of regions having walls extending generally away from the base, each region having a perimeter defined at least in part by the walls and the perimeter of the structure.

18. The method of claim 10, wherein the structure is formed of molded plastic.

19. The method of claim 10, wherein the shape of the structure is selected from the group consisting of animals, fictional and nonfictional characters, storybook scenes, and landscapes.

20. The method of claim 10, wherein the structure includes a cover distal the base.

21. The method of claim 10, wherein the perimeter region of the structure is transparent.

22. The method of claim 10, wherein the material has a particle size in the range of approximately 100 microns and approximately 300 microns in maximum diameter.

23. The method of claim 10, wherein the material has a pH in the range of approximately 7 to approximately 7.5.

* * * * *